US005132036A

United States Patent [19]

Falou et al.

[11] Patent Number: 5,132,036

[45] Date of Patent: Jul. 21, 1992

[54] LAUNDRY TREATMENT PRODUCT

[75] Inventors: Mohamad S. Falou, Cheadle; Timothy D. Finch, Wirral; Peter F. Garner-Gray, Preston; Andrew T. Hight, Spital; Martin J. Murphy, Bromborough; Geoffrey Newbold, Bebington; Ian E. Niven, Liverpool; Derek G. Savill, Ashton, all of England

[73] Assignee: Lever Brothers Company, Division of Conopco, Inc., New York, N.Y.

[21] Appl. No.: 566,653

[22] Filed: Aug. 13, 1990

[30] Foreign Application Priority Data

| | | | |
|---|---|---|---|
| Aug. 23, 1989 | [GB] | United Kingdom | 8919120 |
| Dec. 5, 1989 | [GB] | United Kingdom | 8927433 |

[51] Int. Cl.[5] .................... C11D 17/00; C11D 7/18; C09K 3/00

[52] U.S. Cl. .................... 252/90; 252/91; 252/92; 252/94; 252/99; 252/186.25; 252/186.27; 8/137

[58] Field of Search .................... 252/91, 94, 186.25, 252/186.27, 90, 92, 99; 8/137

[56] References Cited

U.S. PATENT DOCUMENTS

| | | | |
|---|---|---|---|
| 3,589,857 | 6/1971 | Murray . | |
| 3,915,863 | 10/1975 | Busse et al. . | |
| 4,196,093 | 4/1980 | Clarke et al. | 252/99 |
| 4,348,293 | 9/1982 | Clarke et al. | 252/92 |
| 4,356,099 | 10/1982 | Davies et al. | 252/90 |
| 4,374,747 | 2/1983 | Tai . | |
| 4,391,723 | 7/1983 | Bacon et al. . | |
| 4,407,722 | 10/1983 | Davies et al. | 252/91 |
| 4,410,441 | 10/1983 | Davies et al. | 252/90 |
| 4,428,749 | 1/1984 | Morris | 252/90 |
| 4,514,185 | 4/1985 | Lee et al. | 8/137 |
| 4,555,354 | 11/1985 | Clarke et al. | 252/90 |
| 4,751,015 | 6/1988 | Humphreys | 252/99 |
| 4,818,426 | 4/1989 | Humphreys et al. . | |
| 4,853,143 | 8/1989 | Hardy et al. | 252/90 |
| 4,876,023 | 10/1989 | Dickenson et al. | 252/90 |
| 4,933,103 | 6/1990 | Aoyagi et al. . | |
| 5,015,513 | 5/1991 | Newbold et al. | 252/90 |

FOREIGN PATENT DOCUMENTS

| | | |
|---|---|---|
| 676777 | 12/1963 | Canada . |
| 0011501 | 5/1980 | European Pat. Off. . |
| 253566 | 1/1988 | European Pat. Off. . |
| 0253566 | 1/1988 | European Pat. Off. . |
| 836108 | 6/1960 | United Kingdom . |

*Primary Examiner*—A. Lionel Clingman
*Assistant Examiner*—William S. Parks
*Attorney, Agent, or Firm*—Milton L. Honig

[57] ABSTRACT

A laundry treatment product, in the form of a single-compartment of multicompartment sachet capable of releasing its contents into the wash liquor during the laundry process, contains a particulate laundry treatment composition including a quaternary ammonium- or phosphonium-substituted bleach precursor, for example, cholyl-4-sulphophenyl carbonate, optionally together with a peroxy bleach compound and optionally together with one or more detergent ingredients. The sachet may be a self-contained whole wash product, or a bleach adjunct for use in conjunction with a separate detergent composition.

13 Claims, 2 Drawing Sheets

LAUNDRY TREATMENT PRODUCT

TECHNICAL FIELD

The present invention relates to a product for treating fabrics in a washing machine, in the form of a single- or multicompartment sachet containing a particulate bleaching composition which may optionally include detergent ingredients. An essential ingredient of the bleaching composition is a cationic bleach precursor.

BACKGROUND AND PRIOR ART

EP-A-163417 (Unilever Case C.3035) discloses a non-opening sachet, containing sodium perborate monohydrate and the precursor, tetraacetyl ethylenediamine (TAED), for use as a wash adjunct. The sachet contains no detergent ingredients, and no other beaching systems are disclosed.

EP-A-293 139 (Procter & Gamble) discloses calendar-bonded or calendar-finished laundry sachets containing detergent compositions which may contain bleaching ingredients, including various bleach precursors such as tetraacetyl ethylenediamine (TAED) and sodium 3,3,5-trimethyl hexanoyl oxybenzene sulphonate (SNOBS). the bleach precursors, when present, are sacheted in admixture with the other ingredients of the composition.

U.S. Pat. No. 4,410,441 (Unilever Case C.1092) discloses a two-compartment sachet of water-insoluble material for sequential dosing of particulate detergent ingredients to a wash liquor. One compartment contains a non-bleaching detergent composition (nonionic surfactant, sodium carbonate, calcite, soap, and minor ingredients), while the other compartment contains sodium perborate tetrahydrate. Release into the wash liquor is by leaching out through water-insoluble water-permeable sachet walls.

GB 836 108 (Henkel) discloses a bleaching detergent composition containing a percompound (preferably perborate) and an activator, for example, benzoic anhydride or propionic anhydride. The activator, and if desired the percompound, can be separated from the remaining ingredients by wrapping in a water-soluble film.

U.S. Pat. No. 4,751,015 and U.S. Pat. No. 4,818,426 (Unilever Case C.6034) and out copending unpublished European Patent Application No. 90 201 338.2 (Unilever Case C.6085) disclose the cationic bleach precursor cholyl-4-sulphophenyl carbonate per se and in noodle form. Other cationic bleach precursors are disclosed in EP-A-284 292 and EP-A-303 520 (Kao).

It has now been found that sacheting brings especial advantages and benefits in connection with bleach precursors of the cationic (quarterly ammonium or phosphonium) type.

DEFINITION OF THE INVENTION

The present invention provides a laundry treatment product in the form of a single-compartment of multicompartment sachet capable of releasing its contents into the wash liquor during the laundry process, the sachet containing a particulate laundry treatment composition comprising:

(i) a quaternary ammonium- or phosphonium-substituted bleach precursor, (ii) optionally an inorganic or inorganic peroxy bleach compound, and (iii) optionally one or more detergent ingredients.

DETAILED DESCRIPTION OF THE INVENTION

The particular laundry treatment composition

The sachet product of the invention contains a particulate laundry treatment composition. As an essential ingredient, there must be present a quaternary ammonium- or phosphonium-substituted bleach precursor (i). Preferably the bleach precursor (i) is a quaternary ammonium- or phosphonium-substituted peroxycarbonic acid precursor, most preferably, cholyl-4-sulphonenyl carbonate; or a quaternised precursor yielding a substituted cationic perbenzoic acid, most preferably, N,N,N-trimethyl ammonium toluoyloxy benzene sulfphonate. More details of these and related materials, and examples of other suitable bleach precursors, are given below.

Three principle embodiments of the invention are envisaged. In the first embodiment the sachet product is a bleach adjunct intended to be used in conjunction with a bleaching detergent composition containing a peroxy bleach compound, in order to boost its performance particularly at low temperatures. Such a product does not itself contain a peroxy bleach compound, and indeed need not contain any functional ingredients other than the bleach precursor (i).

In the second embodiment, the sachet product provides a complete bleaching system, and comprises in addition to the bleach precursor (i) a peroxy bleach compound (ii), that is to say, an inorganic or organic peroxide capable of liberating hydrogen peroxide in water. This second embodiment is especially suitable for use in conjunction with a non-bleaching detergent composition, in order to provide bleaching capability when a washload requires it, but can also be used to boost the bleaching capacity of a conventional fully formulated detergent composition when an especially heavily soiled or stained load is to be washed.

In the third embodiment, the sachet product is a self-contained whole wash product containing, as well as the bleaching ingredients (i) and (ii), detergent ingredients, for example, surfactants, builders, enzymes, fluorescers and foam controllers.

As indicated in more detail below, the sachet may be in the form of a single compartment sachet, but multicompartment sachets are especially preferred. Compartmentalisation may beneficially be used to segregate the various ingredients indifferent ways.

The cationic bleach precursor (i)

Quaternary ammonium- or phosphonium-substituted peroxyacid precursors which may be used in the product of the invention are disclosed, for example, in U.S. Pat. No. 4,751,015 (Unilever Case C.6034), U.S. Pat. No. 4,397,757 (Unilever Case B.423), EP-A-284 292 (Kao), EP-A-303 520 (Kao), and EP-A-331 229 (Unilever Case C.7116). Examples of peroxyacid bleach precursors of this class include:

Quaternary ammonium-substituted peroxycarboxylic acid precursors having the formula:

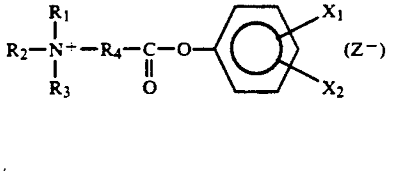

wherein $R_1$, $R_2$ and $R_3$ are each a radical selected from the group consisting of alkyl, alkenyl, hydroxyalkyl and polyoxyalkylene containing from 1 to 18 carbon atoms; or two of $R_1$, $R_2$ and $R_3$ together with $R_4$ and the N-atom form an optionally substituted, nitrogen-containing heterocyclic ring system; or two or more of $R_1$, $R_2$ and $R_3$ together with the N-atom form an optionally substituted, nitrogen-containing heterocyclic ring system;

$R_4$ (if not formed into a nitrogen-containing heterocyclic ring system together with $R_1$ and/or $R_2$ and/or $R_3$) is a bridging group selected from;

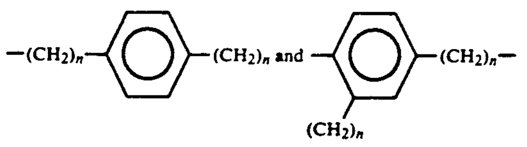

wherein each n can be 0 or 1;

$X_1$ and $X_2$ are each individually H or a substituent selected from $-SO_3^-M^+$; $-COO^-M^+$; $-SO_4^-M^+$; $(-N^+R_1R_2R_3)Z^-$; $-NO_2$; and $C_1-C_8$ alkyl groups;

M is a hydrogen, alkali metal, ammonium or alkyl- or hydroxyalkyl-substituted ammonium cation; and $Z^-$ is chloride, bromide, hydroxide, nitrate, methosulphate, bisulphate or acetate anion.

Preferably, $X_1$ is hydrogen and $X_2$ is $-SO_3^-M^+$ or $-COO^-M^+$.

The following compounds are representative of the precursors within this group, $R_1$, $R_2$, $R_3$, M and $Z^-$ being as defined previously, and R being any one of $R_1$, $R_2$ and $R_3$:

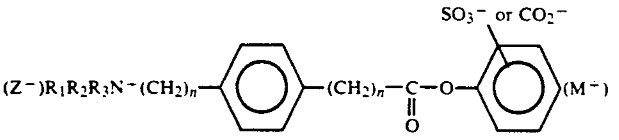
(I)

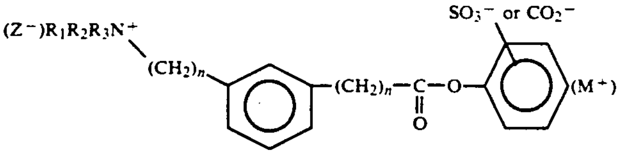
(II)

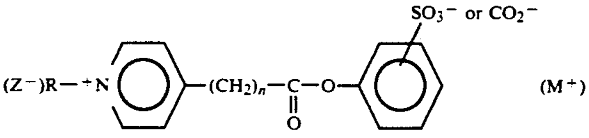
(III)

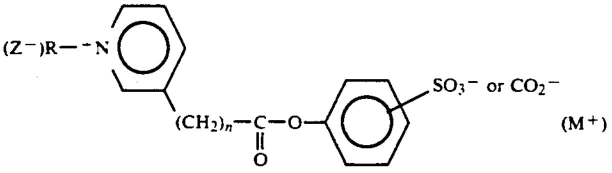
(IV)

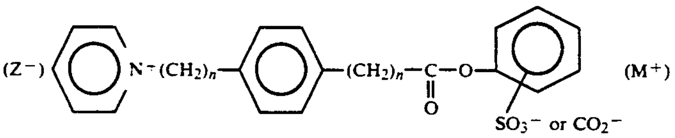
(V)

Preferred compounds are those of classes I, II and III and typical examples thereof are:

i.
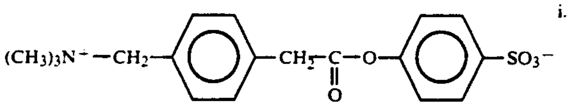

ii.
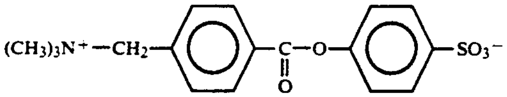

iii.
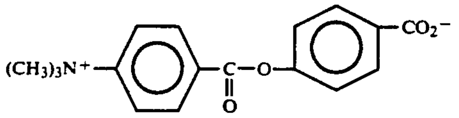

iv.
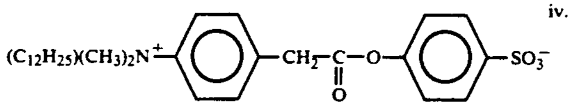

v.
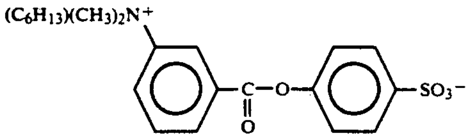

-continued vi.

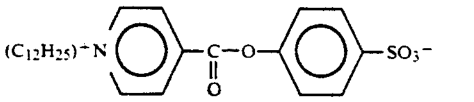

vii.

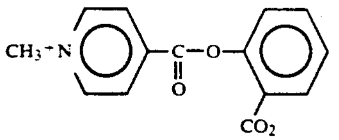

Particularly preferred precursors in this group are those of class II above, which yield a substituted cationic perbenzoic acid, i.e. those having the formula:

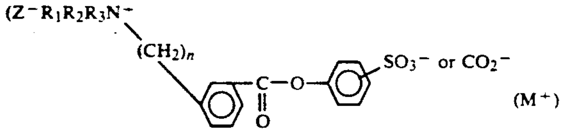

Typical examples are illustrated above by formulae (ii), (iii) and (v). Especially preferred is N,N,N-trimethyl ammonium toluyloxy benzene sulphonate, illustrated in formula (ii).

A further group of bleach precursors which may be used in accordance with the invention are the quaternary ammonium- or phosphonium-substituted peroxy carbonic acid precursors, having the formula:

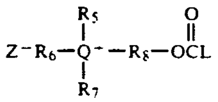

wherein:

$R_5$, $R_6$ and $R_7$ are each a radical selected from the group consisting of alkyl, alkenyl, alkynyl, cycloalkyl, cycloalkenyl, alkaryl, aryl, phenyl, hydroxyalkyl, polyalkylene and $R_8OCOL$;

or two or more of $R_5$, $R_6$ and $R_7$ together form an alkyl substituted or unsubstituted nitrogen-containing heterocyclic ring system;

or at least one of $R_5$, $R_6$ and $R_7$ is attached to $R_8$ to form an alkyl substituted or unsubstituted nitrogen containing heterocyclic ring system;

$R_8$ is selected from the bridging group consisting of alkylene, cycloalkylene, alkylenephenylene, phenylene, arylene, and polyalkoxylene and wherein the bridging group can be unsubstituted or substituted with $C_1$–$C_{20}$ alkyl, alkenyl, benzyl, phenyl and aryl radicals;

Z- is a monovalent or multivalent anion leading to charge neutrality when combined with Q+ in the appropriate ratio and wherein Z- is sufficiently oxidatively stable not to interfere significantly with bleaching by a peroxy carbonic acid:

Q is nitrogen or phosphorus; and

L is a leaving group, the conjugate acid of which has a $pK_a$ in the range of from about 6 to about 13.

Effective leaving groups will induce rapid formation of the peroxy carbonic acid in the presence of a peroxygen source under practical conditions, i.e. in detergent solution during laundering of clothes. Generally, L must be of an electron attracting structure which promotes successful nucleophilic attack by the perhydroxide anion.

Leaving groups which exhibit such properties are those in which the conjugate acid has a $pK_a$ in the range of from about 6 to about 13, preferably from about 7 to about 11, most preferably from about 8 to about 11.

Many suitable leaving group structures have been described in the patent literature. For example U.S. Pat. No. 4,412,934, U.S. Pat. No. 4,483,778, EP-A-170 386 and EP-A-166 571 provide examples of desirable leaving groups, and are incorporated herein by reference. Suitable leaving structures L are those selected from the group consisting of:

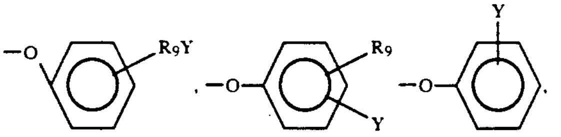

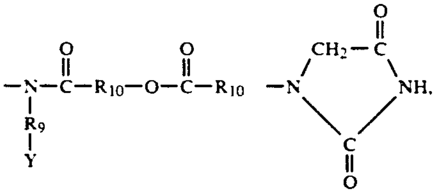

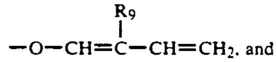 and 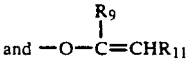

wherein $R_9$ and $R_{10}$ are a $C_1$–$C_{12}$ alkyl group, $R_{11}$ is H or $R_9$, and Y is H or a water solubilising group. Preferred solublising groups are $—SO_3M^+$, $—COO^-M^+$, $—SO_4^-M^+$, $—N^+(R_9)_3X^-$, $NO_2$, OH, and $O—N(R_9)_2$ and mixtures thereof: wherein $M^+$ is a hydrogen, alkali metal, ammonium or alkyl or hydroxyalkyl substituted ammonium cation and $X^-$ is a halide, hydroxide, phosphate, sulphate, methyl sulphate or acetate anion.

Most preferred of the leaving groups is the phenol sulphonate type. Especially preferred is the 4-sulphophenol group. Sodium, potassium and ammonium cations are the preferred counterions to the sulfphonphenol structures.

It is most preferred that Q be nitrogen. Furthermore, the precursor and respective peracid derivative compounds should preferably contain a quaternary ammonium carbon surrounded by $R_5$, $R_6$ and $R_7$, each the same or different and having $C_1$–$C_{20}$ atom radicals selected from the group consisting of alkyl, alkylaryl, benzyl, hydroxyalkyl, heterocyclic rings containing the quaternary nitrogen groups where $R_5$ and $R_8$ or $R_5$ and $R_6$ are joined together, and mixtures of groups thereof.

In particular, it is desirable that $R_5$ be a short chain $C_1$–$C_4$ alkyl radical, preferably methyl, while $R_6$ and $R_7$ be a longer chain $C_7$–$C_{20}$ alkyl or alkylaryl, such as stearyl, lauryl or benzyl group. With regard to the $R_8$ bridge between the quaternary nitrogen and carbonate groups, it is desirable that $R_8$ be a bridging group selected from $C_2$–$C_{20}$ alkylene, $C_6$–$C_{12}$ phenylene, $C_5$–$C_{20}$ cycloalkylene, and $C_8$–$C_{20}$ alkylenephenylene groups. Preferably, the alkylene groups should have 2 carbon atoms. Further, the bridging group can be unsubstituted or substituted with $C_1$–$C_{20}$ alkyl, alkenyl, benzyl, phenyl and aryl radicals.

The preferred precursor in this class of compounds is exemplified by the following structure:

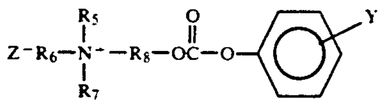

Most preferred is 2-(N,N,N-trimethylammonium) ethyl sodium 4-sulphophenyl carbonate chloride also known as cholyl-4-sulphophenyl carbonate. Other examples in this group of compounds are listed in U.S. Pat. No. 4,751,015 (Unilever Case C.6034), and are incorporated herein by reference.

Another preferred group of bleach precursors for use in accordance with the invention is described in EP-A-303 520 (Kao); and an especially preferred example is the N,N,N-trimethylammonium acetonitrile salt having the formula:

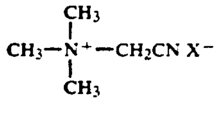

where $X^-$ is any suitable monovalent anion.

The peroxy bleach compound (ii)

Except in the first embodiment, the particulate laundry treatment composition contained in the sachet product of the invention also comprises an inorganic or organic peroxy bleach compound (ii) capable of yielding hydrogen peroxide in aqueous solution.

Typically, the molar ratio of hydrogen peroxide (or a peroxy compound generating the equivalent amount of $H_2O_2$) to percursor may range from 0.5:1 to about 20:1, preferably 1:1 to 10:1.

Hydrogen peroxide sources are well known in the art. They include the alkali metal peroxides, organic peroxide compounds such as urea peroxide, and the inorganic persalts, such as the alkali metal perborates, percarbonates, perphosphates and persulfphates. Mixtures of two or more such compounds may also be suitable. Particularly preferred area sodium perborate in tetrahydrate and monohydrate form, and sodium percarbonate.

Sodium perborate monohydrate is an especially preferred choice because it has excellent storage stability while also dissolving very quickly in aqueous washing and bleaching liquors. This rapid dissolution will further contribute to the formation of higher levels of peroxycarbonic or peroxycarboxylic acid, thereby enhancing surface bleaching performance.

Also especially preferred is sodium percarbonate which is free from any possible environmental objections relating to boron content, and which is especially preferred in water-soluble sachets of polyvinyl alcohol-based film because it does not generate borate ions which tend to insolubilise such films in the wash liquor. Compositions containing sodium percarbonate benefit particularly from sacheting because the storage stability of sodium percarbonate in loose powders is not as good as that of sodium perborate.

Our copending Application of even date (Case C.3352) claiming the priority of British Patent Applications Nos. 89 19120.9 (filed on Aug. 23, 1990) and 89 27433.6 (filed on Dec. 5, 1990) describes and claims a detergent sachet (soluble or insoluble) having two compartments, one containing sodium percarbonate (optionally plus other compatible ingredients), the other containing other detergent ingredients (preferably including zeolite).

Other ingredients

Additionally, there may be present in the first and second embodiments of the invention other components as desired to improve dissolution or other properties.

Any of these optional components may be present in the particulate laundry treatment (bleaching) composition at a total level of up to 50% by weight of the composition, but preferably not more than 25% by weight

The detergent composition

In the third embodiment of the invention, the sachet system contains both the bleaching ingredients (i) and (ii) as described above, and detergent ingredients (iii) in particulate form. For convenience, component (iii) will be referred to as the detergent composition, although, as indicated in more detail below, it may not necessarily be present as a discrete entity: both bleaching and detergent ingredients may be distributed separately or together among different compartments of a multicompartment sachet system.

The detergent composition may be a conventional low- or medium-bulk-density detergent powder; such compositions are well known in the art and many are commercially available, hence need not be discussed further.

It is particularly preferred, however, that the detergent composition should have a relatively high bulk density, which is defined within the context of this invention as a bulk density greater than 500 g/litre, preferably water than 650 g/litre, and more preferably greater than 700 g/litre. High bulk density powders can provide a washing performance comparable with that of powders of average bulk density, but in a significantly smaller volume of power, giving storage and transportation benefits. When contained in a sachet, such powders are especially attractive to the consumer, since the sachet can be relatively small and will thus be easier and more economical to dose and handle. Compositions of bulk densities in the 800-1000 g/litre range can give especially compact, attractive sachet products.

Suitable high bulk density detergent powders include those prepared by granulation and densification processes, especially those employing a high speed mixer/granulator (for example Fukae mixer), as described in EP-A-340 013 (Unilever Case C.3235), EP-A-351 937 (Unilever Case C.3261), EP-A-352 135 (Unilever Case C.3312); and those prepared by a two-stage densification of a spray-dried or dry-mixed base, in a high-speed mixer densifier (for example Lodige recycler), and subsequently in a moderate-speed granulator/densifier (for example Lodige ploughshare), as described in EP-A-367 339 (Unilever Case C.7139) and our copending unpublished European patent Application No. 90 200 622.0 filed on Mar. 16, 1990 and claiming the priority of British Patent Application No. 89 07187.2 filed on Mar. 30, 1989 (Unilever Case C.7156).

The detergent composition present in the third embodiment of the present invention includes one or more detergent-active compounds (surfactants), one or more detergency builders, and optionally other ingredients as listed below.

The total amount of detergent-active material in the detergent composition is suitable from 2 to 50 wt%, and preferably from 5 to 40 wt%. Detergent-active material present may be anionic (soap or non-soap), cationic, zwitterionic, amphoteric, nonionic or any combination of these.

Anionic detergent-active compounds may suitably be present in an amount of from 2 to 40 wt%, preferably from 4 to 30 wt%.

Synthetic aninoic surfactants are well known to those skilled in the art. Examples include alkylbenzene sulphionates, particularly sodium linear alkylbenzene sulphonates having an alkyl chain length of $C_8$–$C_{15}$; primary and secondary alkyl sulphates, particularly sodium $C_{12}$–$C_{15}$ primary alcohol sulphates; olefin sulphonates; alkane sulphonates; alkyl xylene sulphonates; alkyl ether sulphates; dialkyl sulphosuccinates; and fatty acid ester sulphonates.

It may also be desirable to include one or more soaps of fatty acids. These are preferably sodium soaps derived from naturally occurring fatty acids, for example, the fatty acids from coconut oil, beef tallow, sunflower or hardened rapeseed oil.

Suitable nonionic detergent compounds which may be used include in particular the reaction products of compounds having a hydrophobic group and a reactive hydrogen atom, for example, aliphatic alcohols, acids, amides or alkyl phenols with alkylene oxides, especially ethylene oxide either alone or with propylene oxide.

Specific nonionic detergent compounds are alkyl ($C_{6-22}$) phenol-ethylene oxide condensates, the condensation products of linear or branched aliphatic $C_{8-20}$ primary or secondary alcohols with ethylene oxide; products made by condensation of ethylene oxide with the reaction products of propylene oxide and ethylenediamine; and alkylpolyglycosides. Other so-called nonionic detergent compounds include long-chain tertiary amine oxides, tertiary phosphine oxides, and dialkyl sulphoxides.

Especially preferred are the primary and secondary alcohol ethoxylates, especially the $C_{12-15}$ primary and secondary alcohols ethoxylated with an average of from 5 to 20 moles of ethylene oxide per mole of alcohol.

The detergent composition also contains one or more detergency builders, suitably in an amount of from 5 to 80 wt%, preferably from 20 to 80 wt%.

Especially preferred are alkali metal (preferably sodium) aluminosilicates, which may suitably be incorporated in amounts of from 5 to 60 wt% (anhydrous basis) of the composition, and may be either crystalline or amorphous or mixtures thereof, having the general formula:

$$0.8\text{–}1.5\ Na_2O.\ Al_2O_3.0.8\text{–}6\ SiO_2$$

These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature.

Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof. Also of interest is the novel zeolite P described and claimed in EP-A-384 070 (Unilever Case T.3047).

Other builders may also be included in the detergent composition if necessary or desired: suitable organic or inorganic water-soluble or water-insoluble guilders will readily suggest themselves to the skilled detergent formulator. Inorganic builders that may be present include alkali metal (generally sodium) carbonate; while organic builders include polycarboxylate polymers such as polyacylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates; and organic precipitant builders such as alkyl- and alkenylmalonates ad succinates, and sulphonated fatty acid salts.

Especially preferred supplementary builders are polycarboxylate polymers, more especially polyacrylates and acylic/amelic copolymers, suitable used in amounts of from 0.5 to 15 wt%, especially from 1 to 10 wt%, of the detergent composition; and monomeric polycarboxylates, more especially citric acid and its salts, suitably used in amounts of from 3 to 20 wt%, more preferably from 5 to 15 wt%.

Preferred detergent compositions used in the present invention do not contain more than 5 wt% of inorganic phosphate builders, and are desirable substantially free of phosphate builders. However, phosphate-built compositions are also within the scope of the invention.

The detergent composition may also contain one of the detergency enzymes well-known in the art for their ability to degrade and aid in the removal of various soils and stains, Suitable enzymes include the various proteases, cellulases, lipases, amylases, and mixtures thereof, which are designed to remove a variety of soils and stains from fabrics. Examples of suitable proteases are Maxatase (Trade Mark), as supplied by Gist-Brocades N.V., Delft, Holland, and Alcalase (Trade Mark), Esperase (Trade Mark) and Savinase (Trade-Mark), as supplied by Novo Industri A/S, Copenhagen, Denmark. Detergency enzymes are commonly employed in the form of granules or marumes, optionally with a protective coating, in amounts of from about 0.1% to about 3.0% by weight of the composition.

The detergent composition may also contain a fluorescer (optical brightener), for example, Tinopal (Trade Mark) DMS or Tinopal CBS available from Ciba-Geigy AG, Basel, Switzerland. Tinopal DMS is disodium 4,4'-bis-(2-morpholino-4-anilino-s-triazin-6-ylamino) stilbene disulphonate; and Tinopal CBS is disodium 2,2'-bis-(phenyl-styryl) disulphonate.

An antifoam material is advantageously included in the detergent composition, especially if the sachet product is primarily intended for use in front-loading drum-type automatic washing machines. Suitable antifoam materials are usually in granular form, such as those described in EP-A-266 863 (Unilever). Such antifoam granules typically comprise a mixture of silicone oil, petroleum jelly, hydrophobic silica and alkyl phosphate as antifoam active material, sorbed onto a porous absorbent water-soluble carbonate-based inorganic carrier material. Antifoam granules may be present in any amount up to 5% by weight of the detergent composition.

It may also be desirable to include in the detergent composition an alkali metal silicate, particularly sodium ortho-, meta- or preferably neutral or alkaline silicate. The presence of such alkali metal silicates at levels, for example, of 0.1 to 10 wt%, may be advantageous in providing protection against the corrosion of metal parts in washing machines, besides providing some measure of building and giving processing benefits.

Further ingredients which can optionally be employed in the detergent composition include antiredeposition agents such as sodium carboxymethylcellulose, polyvinyl pyrrolidone and the cellulose ethers such as methyl cellulose and ethyl hydroxyethyl cellulose; fabric-softening agents; heavy metal sequestrants such as ethylenediamine tetracetic acid salts; perfumes; pigments, colourants or coloured speckles;

Inorganic salts such as sodium and magnesium sulphate, may if desired be present as filler materials in amounts up to 40% by weight of the detergent composition; however as little as 10% or less by weight of the composition of sodium sulphate, or even none at all, may be present, and that is preferred in the interests of compactness. In multicompartment sachets where certain ingredients are segregate, however, these salts may be useful as diluents.

Preferred detergent compositions

As previously indicated, detergent compositions of high bulk density, prepared by processes involving densification and granulation in a high-speed mixer/-granulator, may advantageously be used in the third embodiment of the invention.

These compositions may typically comprise from 5 to 70 wt%, preferably from 5 to 35 wt% of anionc surfactant; from 0 to 10 wt% of nonionic surfactant and from 0 to 5 wt% of fatty acid soap.

One class of preferred detergent compositions that may conveniently be used in accordance with the invention are those containing crystalline or amorphous alkali metal aluminosilicate, especially crystalline zeolite and more especially zeolite 4A, as a detergent builder. Such composition may typically comprise:

(a) from 5 to 35 wt% of non-soap detergent-active material consisting of least partially of anionic surfactant, (b) from 15 to 45 wt% (anhydrous basis) of crystalline or amorphous alkali metal aluminosilicate, and optionally other detergent ingredients to 100 wt%. The weight ratio of (b) to (a) is preferably at least 0.9:1.

An especially preferred class of detergent compositions that may be used is described and claimed in the above mentioned EP-A-340 013 (Unilever Case C.3235). These compositions comprise:

(a) from 17 to 35 wt% of non-soap detergent-active material consisting at least partially of anionic surfactant, and (b) from 28 to 45 wt% of crystalline or amorphous alkali metal aluminosilicate, the weight ratio of (b) to (a) being from 0.9:1 to 2.6:1, preferably from 1.2:1 to 1.8:1, and optionally other detergent ingredients to 100 wt%.

A second class of preferred detergent compositions that may conveniently be use din accordance with the invention are those described in the above mentioned EP-A-351 937 (Unilever Case C.3261). These compositions comprise:

(a) from 12 to 70 wt% of non-soap detergent-active material, and (b) at least 15 wt% of water-soluble crystalline inorganic salts, including sodium tripolyphosphate and-/or sodium carbonate, the weight ratio of (b) to (a) being at least 0.4:1 preferably from 0.4:1 to 9:1 and more preferably from 0.4:1 to 5:1, and optionally other detergent components to 100 wt%.

These compositions preferably contain a total of from 15 to 70 wt% of water-soluble crystalline inorganic salts, which may comprise, for example, sodium sulphate, sodium ortho- or pyrophosphate, or sodium meta- or orthosilicate. Especially preferred compositions contain from 15 to 50 wt%, more preferably from 20 to 40 wt%, of sodium tripolyphosphate.

All these preferred classes of detergent composition that may be used in the product according to the invention may contain conventional amounts of other conventional ingredients, as listed above. These may be incorporated in the detergent composition at any suitable stage, and he skilled detergent formulator will have no difficulty in deciding which ingredient are suitable for admixture in the above mentioned high-speed mixer/granulator, and which are not.

The sachet system

Enclosure of the bleaching compositions and detergent compositions discussed above in a sacket system has been found to be especially beneficial. Sachet products are particularly attractive to the consumer, since they are easy to store and handle. More precise dosage of the laundry treatment agents is possible, and thus a consistent cleaning performance is achieved. Wasteful overdosage, and underdosage which can result in poor cleaning performance, are eliminated by providing the correct dose in a bagged product. Treatment agents enclosed in the sachets of the invention may also have improved stability in storage, especially in humid conditions.

Within the context of this invention the term "sachet system" is taken to mean any discrete sachet structure. This may simply comprise a single sachet, or it may have a more complex form involving multiple sachets and/or compartmented sachets. Various possible forms of the sachet system of the invention will be discussed below in more detail.

In the first embodiment of the invention, where only the bleach precursor (i), optionally plus minor ingredients, is present, the preferred form is a single-compartment sachet. Each sachet may conveniently contain either a single dose suitable for an average washload, or, preferably, a submultiple dose to allow the consumer greater flexibility to vary the amount used depending on the size and degree of soiling of the washload. The preferred unit size is the half dose, that is to say, half the amount judged to be required for an average washload; the consumer can then choose to use a single unit for a lightly soiled or small wash, two for an average wash, and three for an exceptionally large or heavily soiled load, without the inconvenience of having to deal with a large number of very small units.

Of course, a plurality of these single compartments (units) may be joined together in an easily separable manner, for example, via a perforated region, to form in effect a multiple sachet system from which individual sachets (units) may be detached as required. That could in principle be regarded as a multicompartment sachet, but in the context of the present invention the term "multicompartment sachet" has been reserved for structures in which the compartments are not all identical, for example, they differ in size or in their contents or in both.

In the second embodiment of the invention a bleach precursor (i) and a peroxy bleach compound (ii) are both present. These may if desired be together in a single compartment, or may occupy different compartments of a two-compartment sachet; the second arrangement is preferred, because it minimises the possibility of premature precursor perhydrolysis during storage.

Whichever form is adopted, a single unit may represent either a single dose or a submultiple dose, as discussed above for the first embodiment, and units may if desired be joined together in an easily separable manner, for example via a perforated region, to form a multiple sachet system.

Sachet systems for whole-wash products

The third embodiment of the invention relates to sachet systems containing a complete bleaching and detergent composition, comprising a bleach precursor (i), a peroxy bleach compound (ii) and detergent ingredients (the detergent composition) (iii). The simplest form, clearly, is a single-compartment sachet containing all components in admixture; as with the first and second embodiments discussed previously, a single unit may represent either a single dose or a submultiple dose, and units is desired may be joined together in an easily separable manner, for example via a perforated region, to form a multiple sachet system.

There are also many possibilities for compartmentalisation and segregation of the different components (i), (ii), (iii). Furthermore, individual ingredients of those components may be separated out and distributed among different compartments, and optional minor ingredients may be placed wherever their presence is most beneficial or convenient.

Multicompartment sacheting enables potentially reactive ingredients to be separated by compartmentalisation: for example, separation of the bleach precursor (i) from certain detergent ingredients minimises bleach precursor hydrolysis during storage; and separation of the bleach precursor (i) from the peroxy bleach compound (ii) (as in the second embodiment) minimises possible bleach precursor perhydrolysis during storage. Hydrolysis and perhydrolysis of the bleach precursor in storage would affect bleaching performance, and many also reduce the effectiveness of anionic surfactants. Cationic carboxylic acid is produced as a result of bleach precursor hydrolysis or perhydrolysis, and this may react with anionic surfactant to form a compel having little or not detergency.

Separate sacheting of the bleach components (i) and (ii) from the main detergent composition (iii) gives the consumer the freedom to wash with or without bleach depending on the level and nature of the soiling of the washload.

Yet another alternative would be to have a single or sub-multiple dose of detergent and bleaching composition mixture in one set of sachets, and further bleaching composition contained in another separate set of sachets. That arrangement would enable the consumer to use a lower or higher amount of bleach depending on the level and nature of the soiling of the washload.

The product of the invention may thus be presented in many different ways, some allowing the consumer to vary the proportions in which different ingredients are used in the wash, others always retaining a fixed proportionality between the various components. The examples described here are not intended to be limiting, as the skilled reader will readily be able to thick of other combinations.

While a multicompartment sachet of the invention may in principle contain any number of compartments, two-compartment sachets are preferred in order to avoid undue complexity. Three particular two-compartment structures have been found to give good results and will be described in more detail in the Examples below:

Sachet System (a): the bleach precursor (i) is contained in the first compartment of a two-compartment sachet, optionally with a minor proportion of the detergent composition (iii), while the peroxy bleach compound (ii) and at least the major part of the detergent composition (iii) are contained in the second compartment.

Sachet System (b): the bleach precursor (i) and at least the major part of the detergent composition (iii) are contained together in the first compartment, while the peroxy bleach compound (ii) is contained in the second compartment, optionally with a minor proportion of the detergent composition (iii).

Sachet System (c): the bleach precursor (i) and the peroxy bleach compound (ii) are contained together in the first compartment, optionally with a minor proportion of the detergent composition (iii), and at least a major proportion of the detergent composition (iii) is contained in the second compartment.

Of course, as previously indicated, each two-compartment unit may be joined in a readily separable manner to others, for example, by perforations.

Delivery of sachet contents

It is generally preferred that the sachet system should be designed such that the contents will be released at or very shortly after the time of addition to the wash liquor. It is especially preferred that substantially complete delivery of the contents should occur within at most 3 minutes, more preferably at most 1 minute from the time of addition to the wash liquor.

It may sometimes be desirable, however, for the sachet systems can be designed such that at least one compartment or sachet thereof gives a delayed or controlled release of treatment agent. For example, a two compartment sachet could contain a detergent composition which is released rapidly, and a bleaching composition which is released after a delay, or in a more controlled manner. Suitable sachet structures are described in EP-A-236 136 (Unilever Case C.3105). One possibility is a sachet-within-a-sachet construction, whereby the whole or part of the bleaching and/or detergent composition is contained in a first sachet or compartment entirely enclosed within a second sachet or compartment containing the remainder of the composition.

Sachet size and shape

The sachets are conveniently square or rectangular in shape, although any shape may be used.

Where two or more compartments are present, the compartments may, for example, by side-by-side, joined by a common seal, or pairs of compartments may be arranged back-to-back, joined by a common wall. The former arrangement is more suitable for compartments that are to be very different in size, as may be the case in "sachet systems (a) and (b)" mentioned above, and is also easier to make. Other multicompartment arrangements are disclosed in EP-A-236 136 (Unilever Case C.3105).

The size of the sachet will of course depend on the dosage of the bleaching and/or detergent composition it contains. The volume fill of the sachets can be anything up to 100% depending on the size and dosage of the enclosed treatment agents; preferably the sachets are at least 20% full, by volume of the sachet, and if compactness is especially important they are advantageously at least 50% full.

Depending on the type of washing machine and size of washload, a sachet system according to the invention may generally contain, for a single dose, 2 to 50 g in total of components (i) and (ii) (the bleaching composition) and 20 to 200 g of component (iii) )the detergent composition).

Sachet materials

The sachet systems of the invention may be of the non-opening type, where the contents are leached out by the wash liquor through pores in the sachet substrate, or of the opening type where the sachet opens or disintegrates on contact with the wash water.

Opening sachets are composed of a water-insoluble material, such that the opened sachet can be removed from the washing machine at the end of the wash cycle. An opening sachet may be of either water-permeable or water-impermeable material, water-permeable material being preferred. Suitable water-insoluble materials include paper, woven and non-woven fabrics, films of natural or synthetic origin, or combinations thereof having a base weight between 1 an d100 $g/m^2$. Examples of these are disclosed, for example in EP-A-246 897A (Unilever Case C.3121) and include polyamide, polyester, polyacrylate, cellulose acetate, polyethylene, polyvinyl chloride, polypropylene, cellulosic fibres, regenerated cellulosic fibres, and mixtures thereof. Preferred materials include cellulose/polyester mix fabrics, and Manila/viscose non-woven paper, such as is used for sausage casing. Manila/viscose paper having a base weight from about 5 to 40 $g/m^2$, especially from 10 to 30 $g/m^2$, is particularly preferred.

Opening sachets, according to the present invention, are preferably sealed, and optionally coated on the inside or outside or both, with substances which dissolve or disperse in the wash liquor. Examples are animal glue, gelatin, soya bean glue, dextrin, modified starches, natural gums, cellulose derivatives, starch derivatives, silicates and n-methyl methoxy nylon.

Preferably, the sealant materials are heat-sealable resins, which are easy to apply, and easy to seal during sachet manufacture. Suitable heat-sealable resinous materials include polyvinyl alcohol, polyvinyl acetate, polyvinyl pyrrolidone, polyethylene oxide, acrylic reins and mixtures thereof. These heat-sealable resinous materials may also be used in combination with the other water-soluble or water-dispersible materials discussed above.

As an alternative to a water-labile seal, a mechanically weak heat seal that is disrupted by the mechanical action of the washing machine, as described and claimed in EP-B-11 500 (Unilever Case C.1039), may be provided.

Especially preferred are seals composed of a water-labile component and a heat-sealable component, as described and claimed in the aforementioned EP-A-246 897 (Unilever Case C.3121). These seals are sensitive at was temperatures to the combination of water and mechanical agitation encountered in the washing machine environment, and open to release the sachet contents. Preferably, the water-labile component is selected from polyvinyl pyrrolidone, polyvinyl alcohol and dextrin, while the heat-sealable component is selected from vinyl acetate homopolymers, vinyl acetate/ethylene copolymers and polyacrylic acid. An especially preferred combination is a mixture of polyvinyl pyrrolidone and vinyl acetate/ethylene copolymer.

Another preferred sealant, based on polyvinyl pyrrolidone, is disclosed in EP-A-312 277 (Unilever Case C.3196).

It is also within the scope of this invention for the sachet substrate itself to be one which dissolves or disintegrates in the wash liquor. Suitable examples of commercially available water-soluble substrates include polyvinyl alcohol and partially hydrolysed polyvinyl acetate, alginates, cellulose ethers such as carboxymethylcellulose and methylcellulose, polyethylene oxide, polyacryates, and combinations of these. The soluble film may optionally be used in combination with the insoluble films described above. The film material is preferably thermoplastic so that it can be closed by heat-sealing, but that is not essential because thermoplastic coating maybe provided, either over the whole film or just in the areas where seals are to be formed. Seals can also be made by solvent welding.

DESCRIPTION OF THE DRAWINGS

The invention will now be described in furthur detail, by way of example only, with reference to the accompanying drawings, in which.

DETAILED DESCRIPTION

Figure 1:
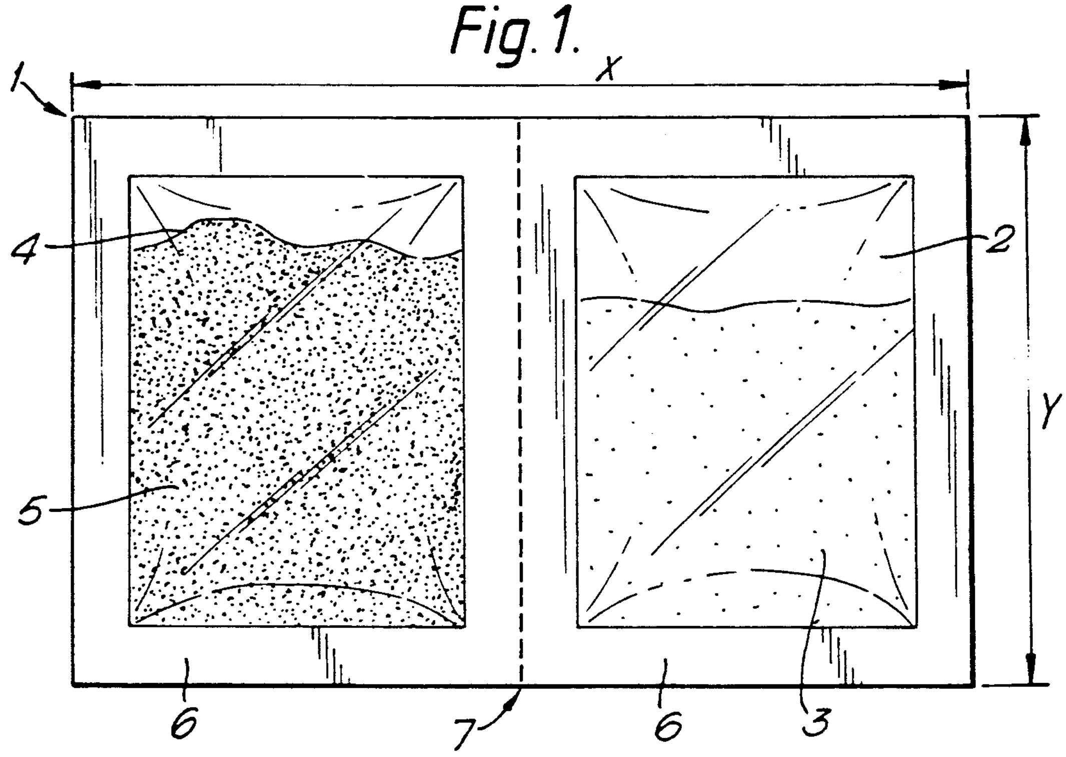
FIG. 1 is a plan view of a single two-compartment opening sachet according to the invention.

Referring now to FIG. 1 of the accompanying drawings, a single but two-compartment sachet 1 has a first compartment 2 containing a bleaching composition 3 comprising a cationic bleach precursor in needle form and a peroxy bleach compound, and a second compartment 4 of equal size containing a particulate detergent composition 5. This is an example of "sachet system (c)" mentioned previously.

The sachet is made of water-insoluble water-permeable material, for example, sausage casing paper, a Manila/viscose paper. Both compartments 2 and 4 are bounded on at least one side each by water-soluble or water-dispersible seals 6, which open in the wash liquor to allow delivery of the sachet contents. The sealant may be, for example, the polyvinyl alcohol/polyvinyl pyrrolidone resin disclosed in EP-A-246 897 (Unilever Case C.3121), which is heat-sealable. This resin may optionally be used for coating the entire sachet material, internal and/or externally.

A line of perforations 7 may optionally be provided between the two compartments 2 and 4; however, if the two compartments are not intended to be separated from one another in use, no perforations need be provided.

The compartments are preferably both at least 20% volume-filled, more preferably at least 50% volume-filled. The two-compartment sachet represents a single dose for use with a washload of average size and degree of soiling in a top-loading washing machine (30–40 litres wash volume). In use it is placed together with the fabrics, preferably on top of the load, before the machine is filled. The dimensions of the sachet may typically be 30–200 mm in the direction marked "X" and 40–240 mm in the direction marked "Y".

Figure 2:
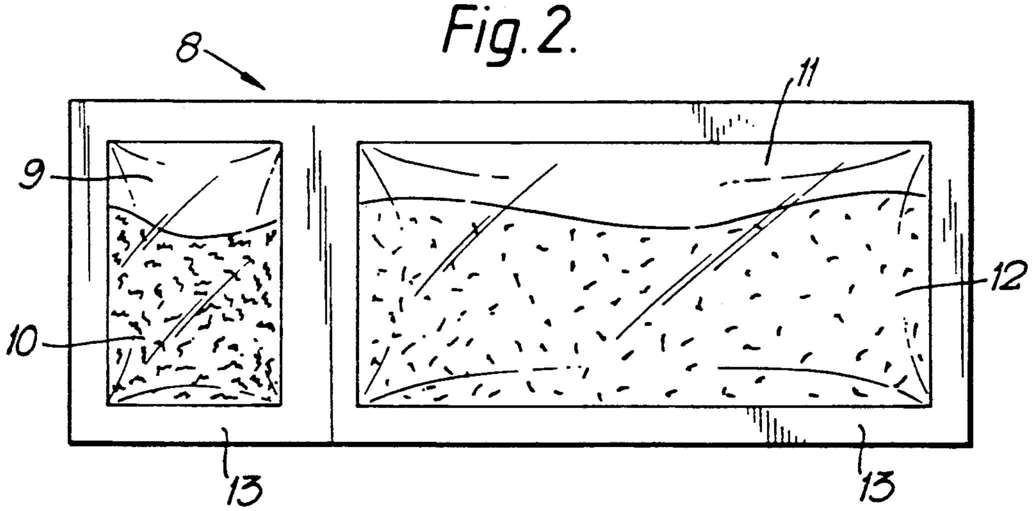
FIG. 2 is a plan view of another single two-compartment sachet according to the invention.

Referring now to FIG. 2 of the accompanying drawings, a single but two-compartment sachet 8 has a small first compartment 9 containing a cationic bleach precursor 10 in noodle form, and a second, larger compartment 11 containing a mixture 12 comprising a particulate detergent composition and a peroxy bleach compound. Seals 13 as described above for FIG. 1 are provided along at least one edges.

This sachet is an example of "sachet system (a)" described previously. The two-compartment sachet represents a half-dose and two should be used for a washload of average size and degree of soiling a top-loading washing machine (30–40 litres wash volume).

The sachet of FIG. 2 could also be used for "sachet system (b)" as described previously. Compartment 9 would then contain a peroxy bleach compound, and compartment 11 would contain the bleach precursor and the detergent composition.

Figure 3:
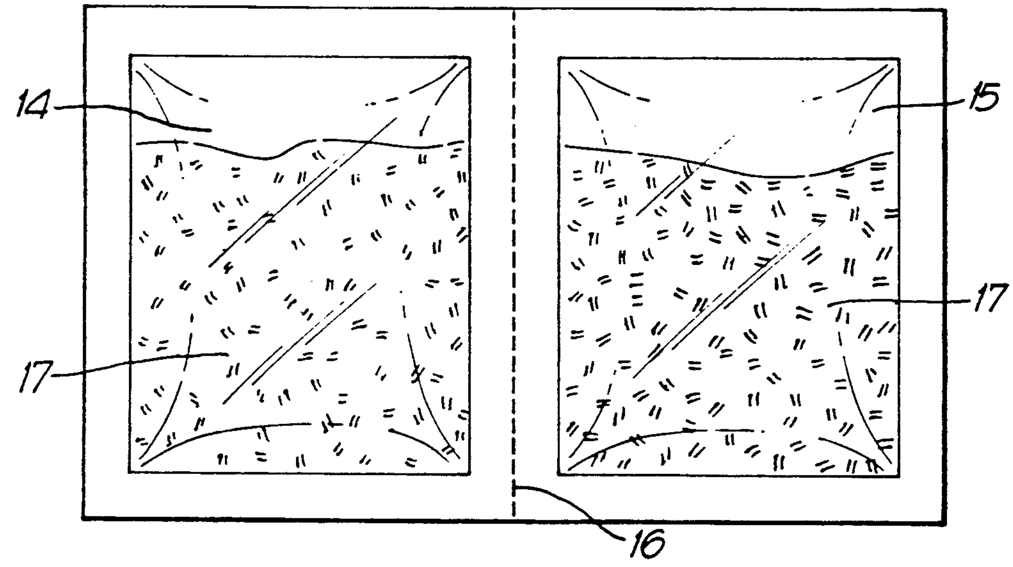
FIG. 3 is a plan view of a joined par of single-compartment opening sachets according to the invention.

Referring now to FIG. 3 of the accompanying drawings, a rectangular single-compartment sachet 14 is joined to a second rectangular single-compartment sachet 15, a line of perforations 16 lying between them.

Each single sachet contains a fully formulated bleaching and detergent composition 17 in accordance with the invention, and each represents a half dose. For a washload of average size and degree of soiling, the double sachet is placed in the washing machine with the fabrics, preferably on top of the load; it is not necessary to separate the two individual sachets, although that may be done if desired. If the washload is small and lightly soiled, the consumer may separate the sachets into two by tearing along the line of perforations 16, and use one sachet only.

Figure 4:
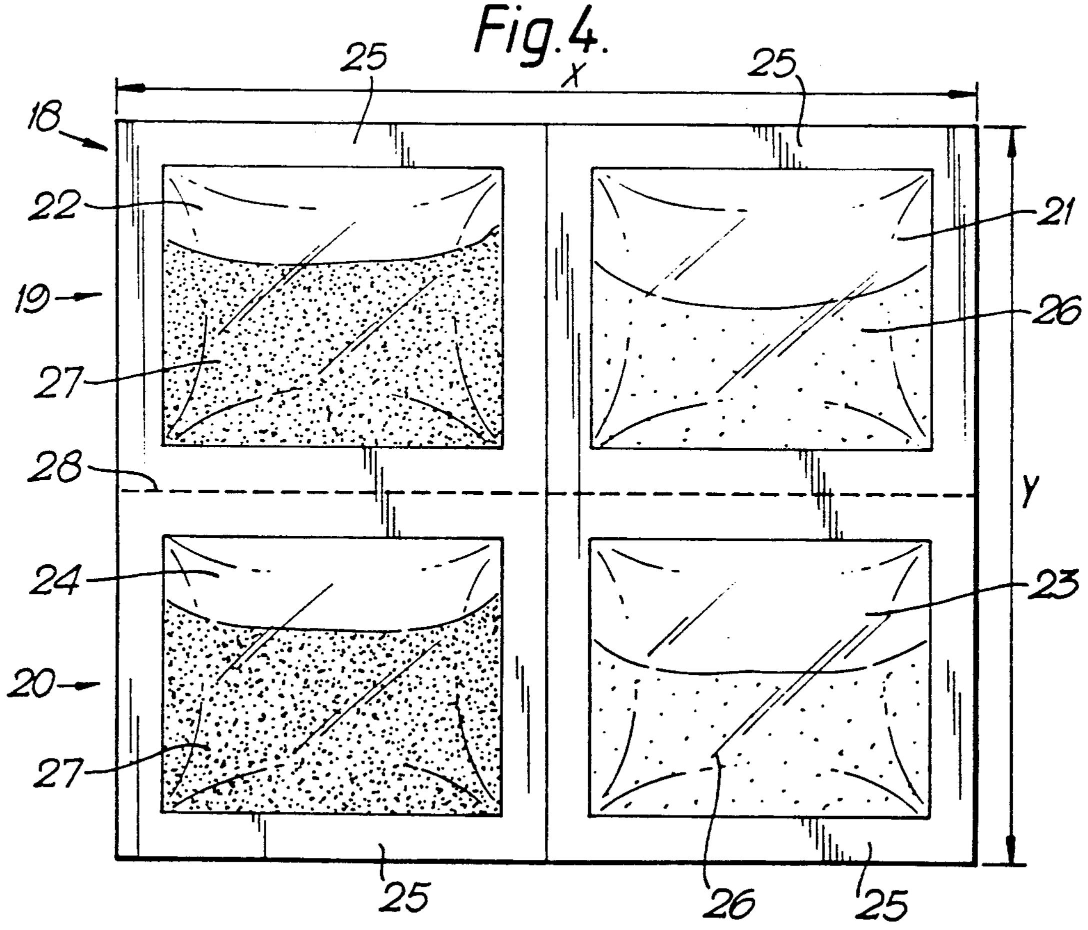
FIG. 4 is a plan view of a joined pair of two-compartment opening sachets according to the invention.

Referring now to FIG. 4 of the accompanying drawings, a double two-compartment sachet 18 consists of two sachets 19, 20 each having two compartments 21, 22 and 23, 24 respectively, the four compartments being arranged in a square array. All four compartments are bounded on at least one side each by water-soluble or water-dispersible seals 25 which open in the wash liquor to allow delivery of the compartments' contents.

In each sachet, one compartment (21, 23) contains a bleaching composition 26 comprising a cationic bleach precursor in noodle form and a peroxy bleach compound, and the other compartment (22, 24) of similar size contains a particular detergent composition 27. The sachets are preferably both at least 20% volume-filled, more preferably at least 50% volume-filled.

A line of perforations 28 is provided between the like compartments 21/23 and 22/24, but not between the unlike compartments 21/22 and 23/24, so that the four-compartment array 19 can readily be divided into two two-compartment sachets 19, 20 but the compartments of each sachet are not readily separable from one another.

Each two-compartment sachet 19, 20 represents a half-dose for use with an average washload in a top-loading washing machine (30–40 litres wash volume). Thus, the four-compartment array 18 provides a single dose of laundry treatment agents for an average washload.

Preferred ranges of lengths for the dimensions of the sachets are typically 55–200 mm in the direction marked "X" and 40–120 mm in the direction marked "Y".

EXAMPLES

The invention is further illustrated by the following non-limiting Examples, in which parts and percentages are by weight unless otherwise stated.

EXAMPLE 1, COMPARATIVE EXAMPLE X

A two-compartment sachet of the general construction shown in FIG. 1 of the accompanying drawings, containing a bleaching composition (i)(ii) in the first compartment (compartment A) and a high bulk density detergent powder (iii) in the second compartment (compartment B), was prepared. This is an example of "sachet system (c)" described previously.

Compartment A—(i)(ii) Bleaching Composition

A bleaching composition (13 g) was prepared to the following formulation:

| | wt % |
|---|---|
| Cholyl-4-sulphophenylcarbonate noodles (see below) | 51.0 |
| Sodium perborate monohydrate | 46.4 |
| Dequest 2047 granules | 2.6 |
| | 100.0 |

The noodle composition was as follows:

| | wt % |
|---|---|
| Cholyl-4-sulphophenylcarbonate (81.6% active ingredient) | 84.0 |
| $C_{18}$, 21 EO nonionic surfactant | 7.2 |
| Lauric acid | 7.8 |
| Sodium lauryl sulphate | 1.0 |
| Minors to | 100.0 |

Compartment B—(iii) High Bulk Density Powder

A high bulk density detergent powder of the formulation given below was prepared by spray-drying an aqueous slurry of all components except the speckles, enzyme and perfume; granulating and densifying the resulting powder in a Fukae (Trade Mark) FS-1200 high-speed mixer/granulator as described in EP 340 013A (Unilever Case C.3235); then admixing the enzyme, speckles and perfume.

| | wt % |
|---|---|
| Linear alkylbenzene sulphonate | 25.0 |
| Nonionic surfactant | 2.0 |
| Soap | 1.0 |
| Zeolite 4A (anhydr.) | 35.0 |
| Water with zeolite | 9.99 |
| Sodium silicate | 4.0 |
| Acrylate/maleate copolymer | 1.0 |
| Sodium sulphate | 1.77 |
| Fluorescer | 0.18 |
| Sodium carboxymethyl cellulose | 0.9 |
| Sodium carbonate | 15.5 |
| Total added water | 2.0 |
| Speckles | 0.8 |
| Enzyme | 0.6 |
| Perfume | 0.25 |
| | 100.00 |

The ratio of zerolite (anhydrous) to total non-soap surfactant in this composition was 1.291. The powder had a bulk density >650 g/litre. 33 g of the above detergent composition was used.

The sachet substrate was Manila/viscose sausage casing paper having a base weight of 21 g/m$^2$. The substrate was coated and sealed with a resin/sealant comprising a mixture of PVA/ethylene copolymer, polyvinylpyrrolidone and water.

The sachets were found to open rapidly in the wash water, within 30 seconds of placement in a top-loading washing machine. The entire contents were released leaving no powder residues at the end of the wash cycle.

The two-compartment sachet of Example 1 was used in the following test to compare its bleaching performance with that of a control (Comparative Example X) containing no bleach precursor. The detergent composition and sachet construction for the control laundry treatment product was as in Example 1; But the second compartment contained sodium sulphate (13 g).

In each case the laundry treatment product was delivered into 30 litres of 6 degrees French hardness water at 20° C. Five uniformly stained test cloths of cotton sheeting, each containing one of the five stains as in Table 1, were washed in the resultant wash liquor for 10 minutes.

The degree of bleaching obtained was assessed by measuring the change in reflectance for each of the five test stains. The results are presented in Table 1. A second experiment used the same sachet products and wash conditions as above, except the water temperature was 10° C. The results are presented in Table 2.

TABLE 1

Change in reflectance of test stains on cotton sheeting after washing at 20° C.

| Stain Type | Example X change in reflectance* | Example 1 change in reflectance* |
|---|---|---|
| Tea | −0.73 | 3.6 |
| Wine | 7.89 | 15.2 |
| Blackberry | 32.8 | 42.6 |
| Oxtail soup | 16.4 | 18.1 |
| Clay | 14.9 | 21.3 |

TABLE 2

Change in reflectance of test stains on cotton sheeting after washing at 10° C.

| Stain Type | Example X change in reflectance* | Example 1 change in reflectance* |
|---|---|---|
| Tea | −1.13 | 2.1 |
| Wine | 6.5 | 13.6 |
| Blackberry | 30.4 | 40.2 |
| Oxtail soup | 16.8 | 18.5 |
| Clay | 16.6 | 17.5 |

*Tea, Wine, Oxtail Soup and Clay stains were measured at 460 nm: blackberry stain was measured at 540 nm.

EXAMPLE 2

A two-compartment sachet containing a high bulk density detergent powder and a separate bleaching composition was prepared, with the detergent composition and sachet construction as in Example 1. The bleaching composition was as in Example 1, except that the sodium perborate monohydrate was replaced by the same level of sodium percarbonate.

EXAMPLE 3, COMPARATIVE EXAMPLE Y

Two-compartment sachets of the general construction shown in FIG. 1 of the accompanying drawings were prepared. In each case, the second compartment (compartment B) contained 25 g of the high bulk density detergent composition of Example 1. The contents of the first compartment (compartment A) were as follows:

| | | g |
|---|---|---|
| Example 3: | Cholyl-4-sulphophenylcarbonate noodles (as Example 1) | 4.5 |
| | Sodium perborate monohydrate | 6.0 |
| | Dequest 2047 granules | 0.19 |
| | | 10.69 |
| Example Y: | TAED granules | 1.5 |
| | Sodium perborate monohydrate | 5.25 |
| | Sodium sulphate | 7.0 |
| | | 13.75 |

These are examples of "sachet system (c)" mentioned previously.

The compositions in the A compartments were chosen to give approximately equivalent peracid concentrations in the wash liquor.

The bleaching performances of these sachets, and that of a bleach-free control as in Comparative Example X, on cotton test cloths stained with tea, wine and blackberry, were compared in a single wash, in twin-tube and top-loading automatic washing machines, in the presence of mixed soiled washloads, using ambient wash water (7°-25° C.) of 5° (French) hardness, low agitation, and a wash time of 10 minutes. One sachet per wash was used.

The results, shown as the difference (ΔΔR) between the reflectance increase observed using the bleaching sachet system 3 or Y and that observed using the bleach-free control, are presented in Table 3. The results demonstrate the superiority of the sachet system of Example 3, containing cholyl-4-sulphophenyl carbonate, under these conditions of low wash temperature, low agitation and short wash time.

TABLE 3

| Stain Type | Example 3 | Example Y |
|---|---|---|
| Tea | 4.4 | 1.1 |
| Wine | 6.4 | 0.7 |
| Blackberry | 11.3 | 2.4 |

EXAMPLES 4 to 7, COMPARATIVE EXAMPLES Z AND P TO T

In this experiment, the storage stability of various sachet products of the invention were compared with each other and with control sachet systems containing the non-cationic bleach precursor, tetraacetylethylenediamine (TAED). The products all contained the high bulk density detergent composition of Example 1, and the peroxy bleach compound use was sodium perborate monohydrate.

The cationic bleach precursor noodles used in these Examples had the following composition:

| | wt % |
|---|---|
| Cholyl-4-sulphophenyl carbonate (75% active) | 82.0 |

-continued

| | wt % |
|---|---|
| Palmitic acid | 8.3 |
| $C_{18}$. 21 EO nonionic surfactant | 8.7 |
| | 100.0 |

The compositions were designed to deliver equal peracid concentrations into the wash liquor. The mole ratio of precursor to persalt was therefore 1:4 in the compositions containing cholyl-4-sulphophenyl carbonate, and 1:8 in the compositions containing TAED.

Two-compartment sachets as previously described with reference to FIG. 1 of the accompanying drawings and having dimensions of 80×160 mm were prepared, filled with the ingredients detailed in Table 4, and closed by heat-sealing at 185° C./45 psi for 1 second.

Bleach assessment was carried out by washing cotton test cloths stained with tea, wine and blackberry, without a ballast load, in a National (Trade Mark) twin-tube top-loading washing machine containing 35 litres of 7° (French) hard water (5° Ca, 2° Mg), using a wash temperature of 25° C. and a wash time of 10 minutes. The difference ( R) between the reflectance values at 460 nm of the test cloths before and after the wash procedure was used as a measure of bleach performance.

The Peracid determination was also carried out, using a standard thiosulphate titration method.

The products were tested after 10 days' storage in open cartons at 37° C./70% relative humidity. As controls, the same tests were performed on freshly made loose powder, and loose powder stored under the same conditions as the sachet products. The results are presented in Table 5.

TABLE 4

| | Examples 4 and P - sachet system (a) | |
|---|---|---|
| Compartment | Example 4 | Comp. Example P |
| A | Cholyl-4-sulphophenyl carbonate noodles (62% active, 5.46 g) | TAED granules (92%, 1.37 g) |
| B | - Detergent composition | (28.00 g) - |
| | - Sodium perborate monohydrate | (4.44 g) - |
| | - Dequest 2047 | (0.11 g) - |
| | **Examples 5 and O - sachet system (b)** | |
| Compartment | Example 5 | Comp. Example O |
| A | Cholyl-4-sulphophenyl carbonate noodles (5.46 g) | TAED granules (1.37 g) |
| | - Dequest 2047 | (0.11 g) - |
| | - Detergent composition | (28.00 g) - |
| B | - Sodium perborate monohydrate | (4.44 g) - |
| | **Examples 6 and R - sachet system (c)** | |
| Compartment | Example 6 | Comp. Example R |
| A | Cholyl-4-sulphophenyl carbonate noodles (5.46 g) | TAED granules (1.37 g) |
| | - Sodium perborate monohydrate | (4.44 g) - |
| | - Dequest 2047 | (0.11 g) - |
| B | - Detergent composition | (28.00 g) - |
| | **Examples 7 and S - two identical compartments** | |
| Compartment | Example 7 | Comp. Example S |
| A | - Detergent composition | (28.00 g) - |
| | - Sodium perborate monohydrate | (4.44 g) - |
| | - Dequest 2047 | (0.11 g) - |
| | Cholyl-4-sulphophenyl carbonate noodles | TAED granules |

TABLE 4-continued

| | | |
|---|---|---|
| | (5.46 g) | (1.37 g) |
| B | as Compartment A | |
| | **Comparative Examples I, Z, T, U - loose powder** | |
| | Examples I, Z | Examples T, U |
| | Cholyl-4-sulphophenyl carbonate noodles (5.46 g) | TAED granules (1.37 g) |
| | - Sodium perborate monohydrate | (4.44 g) - |
| | - Dequest 2047 | (0.11 g) - |
| | - Detergent composition | (28.00 g) - |

Comparative Examples I and T represented freshly made powders, while Comparative Examples Z and U represented the same powders after storage under the same conditions as the sachet products.

TABLE 5

| Example | Peracid (%) | Reflectance changes (R 460*) Tea | Wine | Blackberry |
|---|---|---|---|---|
| I | 100 | 4.1 | 10.5 | 20.3 |
| T | 100 | 0.6 | 8.5 | 9.5 |
| 4 | 88 | 3.4 | 17.3 | 30.9 |
| P | 82 | 0.4 | 9.1 | 10.4 |
| 5 | 29 | 0.5 | 10.1 | 14.5 |
| Q | 82 | (−0.1) | 9.2 | 10.4 |
| 6 | 59 | 1.7 | 7.4 | 19.0 |
| R | 77 | (−0.7) | 10.2 | 10.0 |
| 7 | 15 | 0.4 | 8.8 | 10.2 |
| S | 75 | (−0.1) | 8.3 | 10.3 |
| Z | 10 | (−0.5) | 8.1 | 8.8 |
| U | 85 | 0.1 | 8.4 | 8.8 |

It is clear from the results obtained with the freshly made powders (I, T) that the composition containing cholyl-p-sulphophenyl carbonate (CSPC) was potentially capable of a much more powerful bleaching action than the composition containing TAED. After 10 days' storage as loose powder, however, this advantage had been entirely lost and the two powders (Z, U) performed very similarly.

However, sacheting was effective to prevent loss of bleaching activity on storage. The most effective was sachet system (a), Example 4, in which the CSPC was isolated from all other components; sachet system (c), Example 6, in which the CSPC, persalt and Dequest were segregated from the detergent composition, and sachet system (b), Example 5, in which the persalt was separated from the remaining ingredients, gave lesser but still significant degrees of protection; and even sacheting of the whole composition together, Example 7, provided some benefit.

For the TAED composition, the effect of sacheting appeared to be much smaller.

EXAMPLE 8, COMPARATIVE EXAMPLES 8, J, K, L, V, N

A similar experiment was carried out using sodium percarbonate as the peroxy bleach compound instead of sodium perborate monohydrate. The products tested were as shown in Table 6, and the results are presented in Table 7.

TABLE 6

| | Examples 8 and J - sachet system (b) | |
|---|---|---|
| Compartment | Example 8 | Comp. Example J |
| A | Cholyl-4-sulphophenyl carbonate noodles (5.46 g) | TAED granules (92%, 1.37 g) |
| | - Dequest 2047 | (0.11 g) - |

TABLE 6-continued

| | | |
|---|---|---|
| B | - Detergent composition | (28.00 g) - |
| | - Sodium percarbonate | (6.96 g) - |
| Comparative Examples V, W, K and L - loose powder | | |
| Examples V, W | | Examples K, L |
| Cholyl-4-sulphophenyl carbonate noodles (5.46 g) | | TAED granules (1.37 g) |
| - Sodium percarbonate | | (6.96 g) - |
| - Dequest 2047 | | (0.11 g) - |
| - Detergent composition | | (28.00 g) - |

Examples V and K represented fresh powders, and Examples W and L represented the same powders after storage under the same conditions as the sachet products.

With both precursors, sacheting gave enhanced bleach stability on storage, but the effect was substantially greater for the CSPC composition.

TABLE 7

| Example | Peracid (%) | Reflectance changes (R 460*) | | |
|---|---|---|---|---|
| | | Tea | Wine | Blackberry |
| V | 100 | 4.1 | 14.2 | 24.7 |
| K | 100 | 1.0 | 8.9 | 10.8 |
| 8 | 30 | 0.7 | 8.5 | 14.5 |
| J | 98 | 1.7 | 8.0 | 10.1 |
| W | — | (−0.5) | 7.9 | 9.1 |
| L | 76 | (−1.1) | 8.0 | 8.7 |

What is claimed is:

1. A laundry treatment product in the form of a single-compartment or multicompartment sachet capable of releasing its contents into the wash liquor during the laundry process, the sachet containing a particulate laundry treatment composition comprising:

(i) a quaternary ammonium-substituted bleach precursor, having the formula:

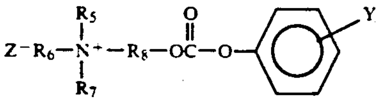

wherein $R_5$, $R_6$ and $R_7$ are each a radical selected from the group consisting of alkyl, alkenyl, alkynyl, cycloalkyl, cycloalkenyl, alkaryl, aryl, phenyl, hydroxyalkyl, polyalkylene and $R_8$O-COL;

or two or more of $R_5$, $R_6$ and $R_7$ together form a alkyl substituted or unsubstituted nitrogen-containing heterocyclic ring system;

or at least one of $R_5$, $R_6$ and $R_7$ is attached to $R_8$ to form an alkyl substituted or unsubstituted nitrogen-containing heterocyclic ring system;

$R_8$ is selected from the bridging group consisting of alkylene, cycloalkylene, alkylenephenylene, phenylene, arylene, and polyalkoxylene and wherein the bridging group can be unsubstituted or substituted with $C_1$–$C_{20}$ alkyl, alkenyl, benzyl, phenyl and aryl radicals;

$Z^-$ is a monovalent or multivalent anion leading to charge neutrality when combined with $N^+$ in the appropriate ratio and wherein $Z^-$ is sufficiently oxidatively stable not to interfere significantly with bleaching by a peroxy carbonic acid; and X is hydrogen or α-sulpho group;

(ii) optionally an inorganic or inorganic peroxy bleach compound present in an effective amount to bleach laundry; and (iii) optionally at least one detergent ingredient present in an effective amount to clean said laundry.

2. A laundry treatment product as claimed in claim 1, wherein the bleach precursor (i) is cholyl-4-sulphophenyl carbonate.

3. A laundry treatment product as claimed in claim 1, wherein the bleach precursor (i) is cholyl-4-sulphophenyl carbonate in noodle form.

4. A laundry treatment product as claimed in claim 1, which comprises a peroxy bleach compound (ii) in a mole ratio of peroxy bleach compound (ii) to bleach precursor (i) within the range of from 0.5:1 to 20:1.

5. A laundry treatment product as claimed in claim 4, which comprises a peroxy bleach compound (ii) selected from the group consisting of sodium perborate monohydrate and sodium percarbonate.

6. A laundry treatment product as claimed in claim 4, wherein the peroxy bleach compound (ii) and the bleach precursor (i) are contained in different compartments of a multicompartment sachet.

7. A laundry treatment product as claimed in claim 4, wherein the peroxy bleach compound (ii) and the bleach precursor (i) are together in a single-compartment sachet or in the same compartment of a multicompartment sachet.

8. A laundry treatment product as claimed in claim 1, which a comprises as component (iii) a particulate detergent composition.

9. A laundry treatment product as claimed in claim 1, wherein the particulate detergent composition (iii) and the bleach precursor (i) are contained in different compartments of a multicompartment sachet.

10. A laundry treatment product as claimed in claim 1, including a peroxy bleach compound (ii) and a particulate detergent composition (iii), wherein the bleach precursor (i), optionally with a minor proportion of the particulate detergent composition (iii), is contained in a first compartment of a multicompartment sachet, and the peroxy bleach compound (ii) and at least a major proportion of the particulate detergent composition (iii) are contained together in a second compartment.

11. A laundry treatment product as claimed in claim 1, including a peroxy bleach compound (ii) and a particulate detergent composition (iii), wherein the bleach precursor (i) and at least a major proportion of the particulate detergent composition (iii) are contained together in a first compartment of a multicompartment sachet, and the peroxy bleach compound (ii), optionally with a minor proportion of the particulate detergent composition (iii), is contained in a second compartment.

12. A laundry treatment product as claimed n claim 1, including a peroxy bleach compound (ii) and a particulate detergent composition (iii), wherein the bleach precursor (i) and the peroxy bleach compound (ii), optionally with a minor proportion of the particulate detergent composition (iii), are contained together in the first compartment of a multicompartment sachet, and at least a major proportion of the particulate detergent composition (iii) is contained in a second compartment.

13. A laundry treatment product as claimed in claim 1, in the form of a sachet having two compartments.

* * * * *